(12) United States Patent
Schwiebert et al.

(10) Patent No.: US 6,895,139 B2
(45) Date of Patent: May 17, 2005

(54) BISTABLE THERMOPNEUMATIC OPTICAL SWITCH

(75) Inventors: Matt Schwiebert, Cupertino, CA (US); Frederik Sporon-Fiedler, Redwood City, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/417,024

(22) Filed: Apr. 15, 2003

(65) Prior Publication Data

US 2004/0208424 A1 Oct. 21, 2004

(51) Int. Cl.[7] .............................................. G02B 6/26
(52) U.S. Cl. ......................................... 385/18; 385/16
(58) Field of Search ............................. 385/15–19, 147

(56) References Cited

U.S. PATENT DOCUMENTS

| | | | |
|---|---|---|---|
| 4,988,157 A | | 1/1991 | Jackel et al. |
| 5,761,352 A | * | 6/1998 | Kitajima et al. .............. 385/16 |
| 6,212,308 B1 | | 4/2001 | Donald |
| 6,323,447 B1 | | 11/2001 | Kondoh et al. |
| 6,487,333 B2 | * | 11/2002 | Fouquet et al. ............... 385/18 |
| 6,674,934 B2 | * | 1/2004 | Carey et al. ................... 385/16 |

FOREIGN PATENT DOCUMENTS

| | | |
|---|---|---|
| JP | 2000-275552 | 10/2000 |
| JP | 2000-275553 | 10/2000 |
| JP | 2000-275554 | 10/2000 |
| JP | 2001-142010 | 5/2001 |

OTHER PUBLICATIONS

"Thermo–capillary Optical Switch," by Makoto Sato, Makoto Horie, Nobuaki Kitano, Katsuya Ohtomo and Hiroaki Okano. Hitachi Cable Review No. 20. pp. 19–24. Aug. 2001.

Makihara, M., et al., "Micromechanical Optical Switches Based on Thermocapillary Integrated in Waveguide Substrate" Journal of Lightwave Technology, vol. 17. No. 1, Jan. 1999, pp. 14–18.

Sakata T., et al., "Improvement of Switching Time in a Thermocapillarity Optical Switch", Journal of Lightwave Technology, vol. 19, No. 7. Jul. 2001, pp. 1023–1027.

Young, T., "An Essay On The Cohesion of Fluids," Dec. 20, 1804, from "Miscellaneous Works", G. Peacock, ed., J. Murray, London, 1885, vol. I, p. 418 et seq.

Togo, H., et al. "Multi–Element Thermo–Capillary Optical Switch and Sub–Nanoliter Oil Injection for its Fabrication", IEEE 0–7803–5194–0/99, 1999, pp. 418–423.

Makoto Sato, Makoto Horie, Nobuaki Kitano, Katsuya Ohtomo and Hiroaki Okano "Thermo–Capillary Optical Switch", Hitachi Cable Review, No. 20, Aug. 2001, pp. 19–24.

* cited by examiner

*Primary Examiner*—Brian Healy
*Assistant Examiner*—Christopher M. Kalivoda

(57) ABSTRACT

An apparatus and method for switching optical signal is disclosed. An optical signal switch array includes a plurality of optical switches, each optical switch having a first trench adapted to hold index-matching fluid, and a second trench adapted to hold the index-matching fluid, but initially containing gas, the second trench connected to said first trench. A first expansion chamber is connected to the first trench, the first expansion chamber adapted to hold gas. A second expansion chamber is connected to the second trench, the second expansion chamber adapted to hold gas. To effect switching, the first expansion chamber is heated expanding gas in the first expansion chamber, the expanding gas shifting the index-matching fluid in the first trench to the second trench. Bistability is achieved by the use of capillary action, which passively holds the droplet of working fluid in either of two stable states until actuation.

11 Claims, 2 Drawing Sheets

BISTABLE THERMOPNEUMATIC OPTICAL SWITCH

BACKGROUND

The present invention relates to optical switches, and more particularly to thermo-pneumatic optical switches.

In optical communication networks, optical signals are transmitted via waveguides. At various points of an optical communications network, optical switches are used to route optical signals from one waveguide to another waveguide. Various designs of optical switches are available to accomplish the switching function.

For example, free-space micro-electro-mechanical (MEMS) optical switches use multiple mirrors to switch optical signals from one waveguide to another waveguide. In a MEMS optical switch, optical signal suffers a number of insertion losses. Insertion loss occurs each time optical signal encounters a change in media in which it is being carried. In a MEMS optical switch, optical power loss (insertion loss) occurs each time optical signal impinges on and reflects off from a mirror. Further, additional optical power losses occur within MSMS optical switches due to misalignment of mirrors and loss of collimation of the optical signal beam as it traverses unguided through the free space between the mirrors.

Another type of optical signal switch is a thermo-optic switch. Thermo-optic switches rely on the differential thermal expansion between two legs of an optical interferometer. In order to maintain a particular switching state, one leg of the interferometer must be heated to increase its length, resulting in the continuous consumption and dissipation of electric power. Furthermore, the high power requirements lead to thermal cross-talk when multiple switches are integrated into a switch matrix.

Another type of optical switch is a bubble switch. In a bubble switch, index matching fluid fills a switching trench where an input waveguide and output waveguides terminate, the index matching fluid having optical properties (such as refractive index) that matches optical properties of the waveguides. At the first switching state ("through" state), optical signal from the input waveguide passes through the index matching fluid toward a first output waveguide. To effect the switching action, heat is used to nucleate and maintain a bubble within the switching trench. The bubble displaces the index matching fluid thereby causing the optical signal from the input waveguide to be directed toward a second output waveguide via total internal reflection off the gas-substrate interface formed by the vertical trench wall. This is the second switching state ("reflected" state). When heat is removed, the bubble condenses thereby returning to the switch to the "through" state.

In this design, optical signal losses associated with insertion loss, misalignment, and beam collimation loss are minimized. However, bubble switches have high power consumption and high heat generation because they require a continual supply of energy to maintain the switching state. Because of these reasons, the reliability of the bubble switches can be adversely impacted. Further, bubble switches can suffer from cross-talk because a bubble switch array includes multiple bubble switches having a common layer of the index matching fluid within which the bubbles are nucleated. Each nucleation and dissolution of a bubble causes waves within the index matching fluid layer adversely affecting neighboring switches.

A third type of optical switch is a thermo-capillary actuated optical switch. In a thermo-capillary actuated optical switch, capillary action is used to shift index matching fluid into and out from a switching trench thereby effecting the switching action. In this design, optical signal losses associated with insertion loss, misalignment, and beam collimation loss are minimized. Further, a thermo-capillarity actuated optical switch does not require continual application of power because the switch is bi-stable. That is, once a thermo-capillarity actuated optical switch enters one of the two states ("through" or "reflected"), the switch does not require continued power into to maintain that state. However, switching actions of thermo-capillary actuated optical switches are relatively slow. This is because capillary action is used to shift the index matching fluid into and out from the switching trench. The thermo-capillary effect is relatively weak.

Consequently, there remains a need for an improved optical switch that eliminates or alleviates the shortcomings of the prior art optical switches.

SUMMARY

The need is met by the present invention. In a first embodiment of the present invention, an optical switch includes a first trench adapted to hold index matching fluid and a second trench adapted to hold the index matching fluid, the second trench connected to the first trench. A first expansion chamber is connected to the first trench and a second expansion chamber is connected to the second trench.

In a second embodiment of the present invention, an optical switch array includes a plurality of optical switches, each optical switch having a first trench adapted to hold index matching fluid and a second trench adapted to hold the index matching fluid, the second trench connected to the first trench. Further, each optical switch has first expansion chamber is connected to the first trench and a second expansion chamber is connected to the second trench.

In a third embodiment of the present invention, a method for switching optical signals from an input waveguide (terminating at a first trench) to an output waveguide (also terminating at said first trench) is disclosed. The switching is accomplished by shifting index matching fluid from the first trench connected to a first expansion chamber to a second trench by causing gas within said first expansion chamber to expand whereby the expanding gas pushes the index matching fluid from the first trench to the second trench and thus changing optical properties of the first trench.

Other aspects and advantages of the present invention will become apparent from the following detailed description, taken in conjunction with the accompanying drawings, illustrating by way of example the principles of the invention.

DETAILED DESCRIPTION

As shown in the figures for the purposes of illustration, one embodiment of the present invention is exemplified by an optical switch having a first trench adapted to hold an index matching fluid and a second trench adapted to hold the index matching fluid, the second trench connected to the first trench. The first trench is connected to a first expansion chamber and the second trench is connected to a second expansion chamber.

The index matching fluid occupies only one of the two trenches at any time. To effect switching, the index matching fluid is shifted between the two trenches. The shifting is accomplished by heating one of the expansion chambers causing the gas in the heated expansion chamber to expand thereby pushing the fluid from one trench to another trench. Once the fluid shifts, heat is removed from the heated expansion chamber.

Optical switches having the design in accordance with the present invention do not suffer from collimation loss nor misalignment loss. Moreover, optical switches having this design are more reliable than, and consume less power than bubble switches and are faster than capillary switches. This is because the optical switches do not need continued application of power and heat to maintain the switching state and because these optical switches do not depend on capillary effect to produce the switching action. Finally, the optical switches having this design are readily integrated into large arrays, and mass producible using relatively standard planar lightwave circuit and integrated circuit fabrication technologies.

Construction

Figure 1A:
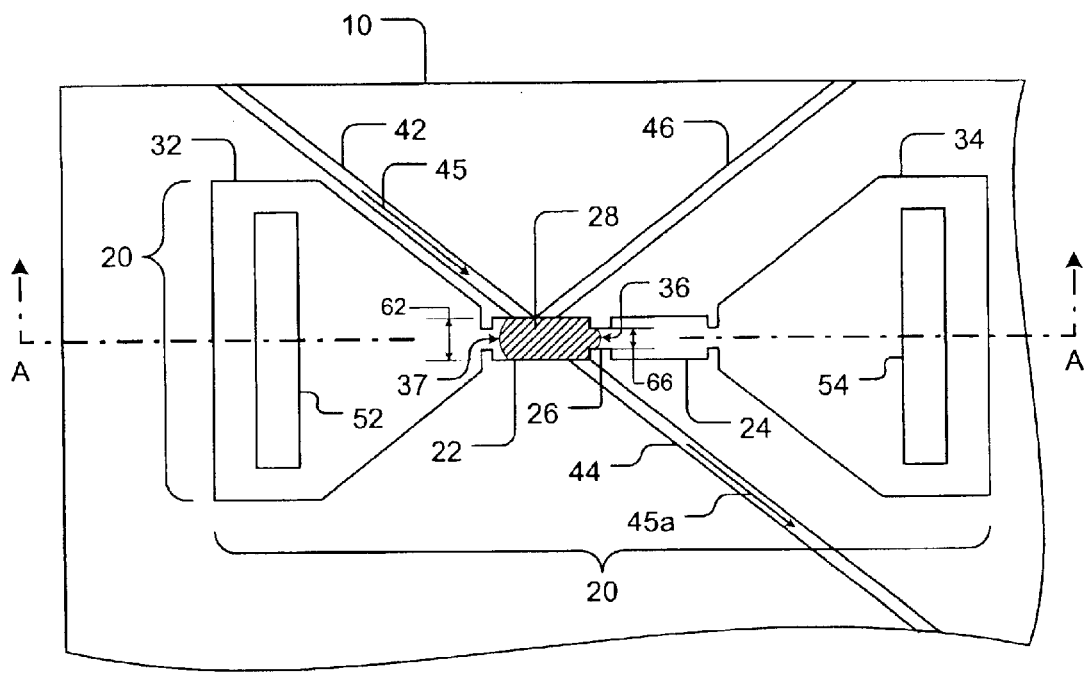
FIG. 1A is a cutaway top view of an optical switch array according to one embodiment of the present invention.
Figure 1B:
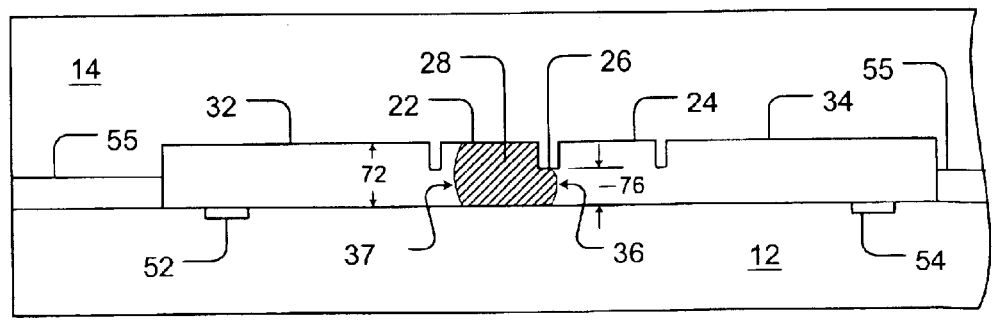
FIG. 1B is a cutaway side view of the optical switch array of FIG. 1A cut along line A—A.

FIG. 1A is a cutaway top view of an optical switch array 10 according to one embodiment of the present invention. FIG. 1B is a cutaway side view of the optical switch array 10 cut along line A—A in FIG. 1A. For simplicity, only one switch 20 is illustrated in FIGS. 1A and 1B; however, in actual implementations, the switching array 10 may include a plurality of switches having similar configuration. Referring to FIGS. 1A and 1B, the switch 20 has a first trench 22 and a second trench 24 connected by an aperture 26. Both the first trench 22 and the second trench 24 are adapted to hold index-matching fluid 28. An input waveguide 42 and two output waveguides 44 and 46 terminate at the first trench 22. In the FIGS. 1A and 1B, the switch 20 is illustrated with the index matching fluid 28 filling only the first trench 22 thereby showing the switch 20 in a first switching state ("through" state). The first trench 22 defines a volume, $V_{T1}$, of space. The second trench 24, in the illustrated embodiment, defines a volume, $V_{T2}$, of space. In the illustrated embodiment, volumes $V_{T1}$ and $V_{T2}$ are substantially similar. For this reason, phrase "trench volume" refers to the volume of any one of the two trenches and is denoted, generically, as $V_T$. In an actual implementation, the $V_T$ can range from 5×10E−14 to 5×10E−8 cubic meters. Of course, the size of the switch 20 and the volume of various portions of the switch 20 including the volume of the trenches, $V_T$, can vary widely depending on implementations and processes used to fabricate the switch 20.

The switch 20 includes a first expansion chamber 32 connected to the first trench 22 and a second expansion chamber 34 connected to the second trench 24. The expansion chamber 32 and 34 are adapted to hold gas such as air or inert gas such as, for example only, nitrogen. The switch 20 further includes a first heater 52 proximal to the first chamber 32 and a second heater 54 proximal to the second chamber 34. The heaters 52 and 54 can be resistive heaters known in the art. The heaters 52 and 54 are connected to circuits that supply the heaters with electrical power. These circuits and configurations are known in the art and are not illustrated in the Figures to avoid clutter. The switch 20 is typically fabricated over a substrate 12 such silicon substrate and is enclosed within cladding. Portions of the switch array 10 fabricated over the substrate 12, including but not limited to the switch 20 and cladding, are referred herein, collectively, as a circuit layer 14. A bonding layer 55 can be used to bond the substrate 12 and the circuit layer 14. For example, the bonding layer can be an eutectic InSn layer. The present invention can include such a layer but is not limited to such construction.

The first expansion chamber 32 defines a volume, $V_{E1}$, of space. The second expansion chamber 34, in the illustrated embodiment, defines a volume, $V_{E2}$, of space. In the illustrated embodiment, volumes $V_{E1}$ and $V_{E2}$ are substantially similar. For this reason, phrase "expansion chamber volume" refers to the volume of any one of the two expansion chambers and is denoted, generically, as $V_E$. In an actual implementation, the $V_E$ can range from 1×10E−12 to 2.5× 10E−6 cubic meters. Again, the size of the switch 20 and the volume of various portions of the switch 20 including the volume of the expansion chambers, $V_E$, can vary widely depending on implementations and processes used to fabricate the switch 20.

Operation

Optical signal 45 from the input waveguide 42 enters the first trench 22. If the switch 20 is in the through state, as illustrated, the optical signal 45 passes through the index-matching fluid 28 toward a first output waveguide 44. This is because the index-matching fluid has optical properties (such as refractive index) which are same or similar to the optical properties of the waveguides 42, 44, and 46.

To actuate the switch 20 to a second switching state ("reflected" state), power is applied to the first heater 52 heating the first expansion chamber 32, the gas within the first expansion chamber 32, or both. As temperature within the first expansion chamber 32 rises, the gas within the first expansion chamber 32 expands in accordance with the ideal gas law which can be expressed, in one form, as $$PV=CT \quad \text{(Equation 1)}$$

where
P is pressure;
V is volume;
C is a constant for any given type of gas; and
T is absolute temperature.

In the illustrated example, the volume, $V_E$, of the first expansion chamber 32 does not change and the constant, C, does not change. Therefore, the pressure P of the gas within the first expansion chamber 32 is proportional to its absolute temperature T.

At the initial through state, the switch 20 (including its expansion chambers 32 and 34) are at some initial temperature $T_i$ and corresponding initial pressure $P_i$. When heated, the pressure within the first expansion chamber 32 rises proportionally to the rise in temperature such that the new pressure within the first expansion chamber becomes $P_A$ where $$P_A = P_i((T_i + \Delta T)/T_i) \quad \text{(Equation 2)}$$

where
$P_A$ is the new pressure within the expansion chamber being heated;
$P_i$ is the initial pressure within the expansion chamber;
$T_i$ is the initial temperature within the expansion chamber; and
$\Delta T$ is the change in temperature ("delta" T).

At pressure $P_A$, the difference in pressure between the gas within the heated first expansion chamber 32 (at pressure $P_A$) and gas within the unheated second expansion chamber 34 (at pressure $P_i$) is $\Delta P$ ("delta" P) where $$\Delta P = P_A - P_i \quad \text{(Equation 3)}$$

As the pressure within the first expansion chamber 32 increases, its gas pushes the index-matching fluid 28 from the first trench 22 to the second trench 24 thereby actuating the switch. When the index-matching fluid 28 shifts to the second trench 24, the first trench 22 is filled with the expanding gas from the first expansion chamber 32. The gas has optical properties (for example refractive index), which are different than the optical properties of the waveguides 42, 44, and 46. Accordingly, when the optical signal 45 is enters the first trench 22, the optical signal is redirected toward the second output waveguide 46 via total internal reflection from the gas-substrate interface at the vertical wall of trench 22.

In order for the index-matching fluid 28 to shift from the first trench 22 to the second trench 24, the difference in pressure between the two expansion chambers 32 and 34, $\Delta P$, needs to overcome capillary holdback pressure across the aperture liquid-gas interface 36 at the aperture 26. Pressure across a liquid-gas interface is given by the LaPlace-Young equation of capillarity, known in the art. Ignoring hydrostatic effects and assuming ideal non-wetting conditions in two dimensions, the pressure drop across the trench (any one of the two trenches 22 and 24) and the aperture 26 are $$2y/h_T \text{ and } 2y/h_A \qquad \text{(Equation 4)}$$

where y is the surface tension constant of the liquid-gas interface;

$h_T$ is the height 72 of the trench; and $h_A$ is the height 76 of the aperture.

Actually, in three dimensions, pressure drop across a liquid-gas interface is $2y(1/W+1/h)$ where W is the width across the interface (for example width 66 for the liquid-gas interface for the aperture 26) and h is the height across the interface (for example height 76 for the liquid-gas interface for the aperture 26). However, in practice, the width, W, is very large relative to the height h. Accordingly, 1/W is very small relative to 1/h. Therefore, in the present analysis the pressure drop across the trench 22 or 24 or and the aperture 26 is approximated without using the width value.

Although ideal non-wetting is assumed in this analysis, in the case where the fluid wets the switch, this analysis is still valid, only $h_A > h_T$. Under wetting conditions, the working fluid 28 is drawn into tight places 26 by capillary action. In order to "hold-back" the droplet 28, a "buldge" ($h_A > h_T$) is used instead of a constriction. Likewise, bulges are used on the ends of the trenches (as opposed to constrictions to contain the working fluid). All the equations hold; however, the sense (direction) of the curvatures of the liquid-gas interfaces are reversed (i.e. 28 looks more like an "hourglass", as opposed to a "barrel" under wetting conditions.

To shift the index-matching fluid 28, $\Delta P$ needs to be greater than the capillary pressure across the aperture liquid-gas interface 36 at the aperture 26 less the capillary pressure generated across the trench liquid-gas interface 37 at the expansion chamber end of the first trench 22; that is, $$\Delta P(2y/h_A)-(2y/h_T) \qquad \text{(Equation 5)}$$

Typical values for the trench width 62 can range in the order of tens of microns, for example 40 micron. However, the present invention is not limited to such widths. Typical values for the aperture width 66 can range in the order of microns or tens of microns, for example 10 microns. However, the present invention is not limited to such widths. Typical values for the trench heights 72 can range in the order of tens of microns, for example 40 microns. However, the present invention is not limited to such heights. Typical values for the aperture height 76 can range in the order of microns or tens of microns, for example 10 microns. However, the present invention is not limited to such heights.

Solving Equation 5 using substitutions from previous equations and using algebraic techniques, the required tem perature rise, $\Delta T$, for actuation of the switch 20 can be expressed as $$\Delta T(2yT_i/P_i)(1/h_A-1/h_T) \qquad \text{(Equation 6)}$$

That is, when the first expansion chamber 32 is heated so that its temperature rises $\Delta T$ from its initial temperature, the expanding gas exerts sufficient pressure on the index-matching fluid 28 to shift the index-matching fluid 28 from the first trench 22 to the second trench 24 thereby actuating the switch 20.

After the actuation, the gas from the first expansion chamber 32 occupies slightly larger volume. This is because the gas now occupies the first expansion chamber 32 plus the first trench 22 due to volumetric displacement of the index-matching fluid 28 from the first trench 22 to the second trench 24. Further, the gas from the second expansion chamber 34 and the second trench 24 occupies slightly smaller volume. This is also because of the volumetric displacement and that the gas now occupies only the second expansion chamber 34.

After actuation, the switch 20 remains latched if the capillary hold-back pressure exceeds the pressure induced by the volumetric displacement of the index-matching fluid 28. This state can be expressed mathematically as $$2P_i(1+V_T/V_E)2y(1/h_A-1/h_T) \qquad \text{(Equation 7)}$$

where $V_T$ is volume of a trench (for example, the first trench 22); and $V_E$ is volume of an expansion chamber (for example, the first expansion chamber 32).

Equation 7 can be re-written in terms of $V_T/V_E$ ratio as $$V_T/V_E(y/Pi) (1/h_A-1/h_T)-1 \qquad \text{(Equation 8)}$$

Figure 2:
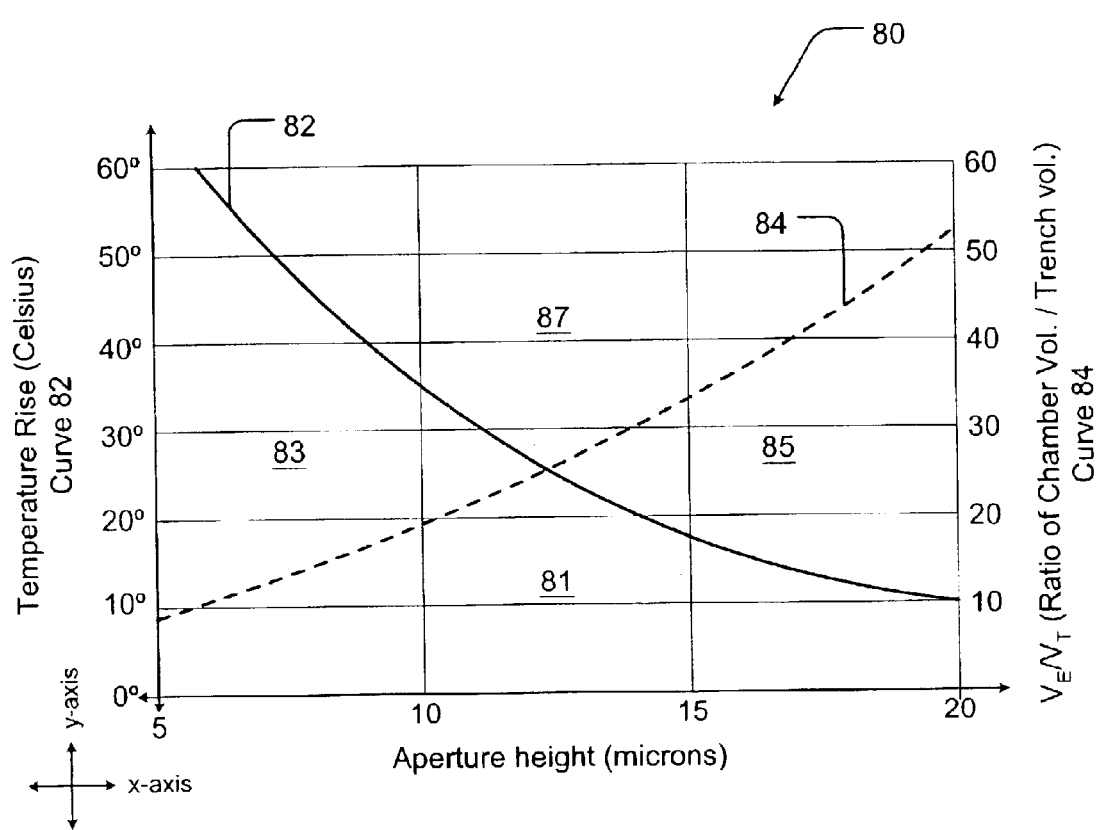
FIG. 2 is a graph illustrating areas of actuation and bistability of the optical switch of FIG. 1A according to one embodiment of the present invention.

FIG. 2 includes a line graph 80 that illustrates points of actuation and bistability of the optical switch 20 of FIGS. 1A and 1B. In the graph 80, the x-axis represents a range of aperture widths from 5 microns to 20 microns. The graph 80 has two y-axes for purposes of convenience. The left y-axis represents a range of temperature rises, $\Delta T$, for actuating the optical switch 20. The temperature rise range on graph 80 is labeled from 0 degree Celsius to 60 degrees Celsius. The left y-axis corresponds with an actuation curve 82. The right y-axis represents a range of ratios of expansion chamber volume to trench volume for stabilizing the index-matching fluid within the trenches following a shift of the index-matching fluid. The ratio range on graph 80 is labeled from 0 to 60. The right y-axis corresponds with a bistability curve 84. The volume ratio for the bistability curve 84 is inverted (relative to Equation 8) for convenience.

Referring to FIG. 2 and continuing to refer to FIGS. 1A and 2B, the actuation curve 82 and the bistability curve 84 illustrate operational characteristics of the present invention. The curves 80 and 82 are plotted for trench width, $W_T$, value of 40 microns; surface tension constant, y, of 0.075 N/m (newtons per meter) and initial pressure, $P_i$, of 101300 Pa (atmospheric pressure at standard temperature and pressure).

Given the above described conditions (of $h_T$, y, and $P_i$), the actuation curve 82 shows the required temperature rise, $\Delta T$ (left y-axis, in Celsius), needed for actuating the switch 20 for a given aperture height, $h_A$ (x-axis, in microns). That is, for a given aperture height, $h_A$, the temperature of the gas of an expansion chamber (for example, the first expansion chamber 32) needs to rise above the actuation curve 82 in order for the increased pressure, $\Delta P$, to overcome the capillary pressure thereby shifting the index-matching fluid to the other trench. Here, the actuation curve 82 is a graphical illustration of the relationships expressed in Equation 6.

For convenience of discussion, the graph 80 can be divided into four areas 81, 83, 85, and 87, each area separated from the other areas by portions of the curves 82 and 84. Areas 81 and 83 are under the actuation curve 82.

Areas 85 and 87 are over the actuation curve 82. Areas 81 and 83 are under the bistability curve 84. Areas 83 and 87 are over the bistability curve 84. Thus, the actuation of the switch 20 of FIGS. 1A and 1B is realized in the areas 85 and 87.

After actuation, the optical switch 20 remains latched in the new switching state if the capillary hold-back pressure exceeds the pressure induced by the volumetric displacement of the index-matching fluid 28 as described in Equations 7 and 8 above. This is referred to as bistability because the switch 20 is stable (remains passively latched) at any one of two states (reflected state and through state) after the heat is removed.

Given the above described conditions (of $h_T$, y, and $P_i$), the bistability curve 84 shows the required ratio $V_E/V_T$ of expansion chamber volume ($V_E$) to trench volume ($V_T$) (right y-axis), needed for realizing bistability of the switch 20 (of FIGS. 1A and 1B) for any given aperture height, $h_A$ (x-axis, in microns). That is, for a given aperture height, $h_A$, the ratio $V_E/V_T$ needs to be above the bistability curve 84 to achieve the desired bistability. The bistability curve 84 is a graphical illustration of the relationships expressed in Equation 8.

To achieve both actuation and bistability, at any given aperture width, the temperature rise $\Delta T$ must be above the actuation curve 82 and the bistability curve 84, or fall within area 87. As aperture height $h_A$ is increased, the required actuation temperature rise, $\Delta T$, decreases; however, the volume ratio $V_E/V_T$ required for latching increases. For example, for a 40 microns trench height, there appears to be an optimal aperture height of about 12 microns. Equations 7 and 8 can be used to calculate the required temperature rise and expansion chamber size for general situations.

The time it takes for the index-matching fluid 28 of FIG. 1A to shift from one trench to another is related to thermal time constant of the heaters 52 and 54. The switching time is expected to be in the order of microseconds depending on the implementation. This is much quicker than the switching time of thermo-capillarity actuated optical switches.

After actuation, no energy is required to maintain the switching state. Accordingly, problems associated with bubble switches are avoided. These problems include high power requirement, thermal crosstalk, high heat dissipation, and low reliability.

From the foregoing, it will be apparent that the present invention is novel and offers advantages over the current art. Although the specific embodiment of the invention is described and illustrated above, the invention is not limited to the specific forms or arrangements of parts so described and illustrated. For example, differing configurations, sizes, or materials may be used to practice the present invention. The invention is limited by the claims that follow. In the following, claims drafted to take advantage of the "means or steps for" provision of 35 USC section 112 are identified by the phrase "means for."

What is claimed is:

1. An optical switch comprising:
   a substrate;
   a bonding layer on said substrate;
   a circuit layer on said bonding layer, said circuit layer bonded to said substrate but separated from said substrate via said bonding layer;
   wherein said substrate, said bonding layer, and said circuit layer define:
      a first trench adapted to hold index-matching fluid;
      a second trench adapted to hold the index-matching fluid, said second trench connected to said first trench;
      a first expansion chamber connected to said first trench;
      a second expansion chamber connected to said second trench;
      an input waveguide, a first output waveguide, and a second output waveguide, all three waveguides terminating at the first trench; and wherein shifting of the index-matching fluid between the first trench and the second trench effects switching of light from the input waveguide.

2. The optical switch recited in claim 1 wherein said first expansion chamber is adapted to hold gas.

3. The optical switch recited in claim 2 wherein said gas is nitrogen.

4. The optical switch recited in claim 1 further comprising a first heater proximal said first expansion chamber, said first heater adapted to heat said first expansion chamber.

5. The optical switch recited in claim 4 further comprising a second heater proximal to said second expansion chamber, said second heater adapted to heat said second expansion chamber.

6. The optical switch recited in claim 1 wherein an aperture connects said first trench with said second trench.

7. The optical switch recited in claim 6 wherein said aperture has a height ranging from 7 microns to 20 microns.

8. An optical switch array comprising a plurality of optical switches, each optical switch comprising:
   a substrate;
   a bonding layer on said substrate;
   a circuit layer on said bonding layer, said circuit layer bonded to said substrate but separated from said substrate via said bonding layer;
   wherein said substrate, said bonding layer, and said circuit layer define:
      a first trench adapted to hold index-matching fluid;
      a second trench adapted to hold the index-matching fluid, said second trench connected to said first trench;
      a first expansion chamber connected to said first trench, said first expansion chamber adapted to hold gas;
      a second expansion chamber connected to said second trench, said second expansion chamber adapted to hold gas;
      an input waveguide, a first output waveguide, and a second output waveguide, all three waveguides terminating at the first trench; and wherein shifting of the index-matching fluid between the first trench and the second trench effects switching of light from the input waveguide.

9. The optical switch array recited in claim 8 further comprising a first heater adapted to heat the gas in said first expansion chamber.

10. The optical switch array recited in claim 9 further comprising a second heater adapted to heat the gas in said second expansion chamber.

11. The optical switch array recited in claim 8 wherein the index-matching fluid is non-wetting on surfaces of said first trench and said second trench.

* * * * *